US011109606B2

(12) United States Patent
Bergsma

(10) Patent No.: US 11,109,606 B2
(45) Date of Patent: Sep. 7, 2021

(54) VEGAN CHEESE ANALOGUE

(71) Applicant: Coöperatie AVEBE U.A., Veendam (NL)

(72) Inventor: Jacob Bergsma, Veendam (NL)

(73) Assignee: Coöperatie AVEBE U.A., Veendam (NL)

( * ) Notice: Subject to any disclaimer, the term of this patent is extended or adjusted under 35 U.S.C. 154(b) by 238 days.

(21) Appl. No.: 16/079,182

(22) PCT Filed: Mar. 1, 2017

(86) PCT No.: PCT/NL2017/050124
§ 371 (c)(1),
(2) Date: Aug. 23, 2018

(87) PCT Pub. No.: WO2017/150973
PCT Pub. Date: Sep. 8, 2017

(65) Prior Publication Data
US 2019/0037872 A1 Feb. 7, 2019

(30) Foreign Application Priority Data

Mar. 1, 2016 (EP) ..................................... 16158105

(51) Int. Cl.
*A23C 20/00* (2006.01)
*A23C 20/02* (2021.01)
(52) U.S. Cl.
CPC .............. *A23C 20/00* (2013.01); *A23C 20/02* (2013.01); *A23C 2250/15* (2013.01); *A23V 2002/00* (2013.01)
(58) Field of Classification Search
CPC ...... A23C 20/00; A23C 20/02; A23C 2250/15
USPC ....................................................... 426/578
See application file for complete search history.

(56) References Cited

U.S. PATENT DOCUMENTS

| | | | |
|---|---|---|---|
| 5,807,601 A * | 9/1998 | Carpenter .............. | A23C 20/00 426/578 |
| 6,890,579 B2 | 5/2005 | Buwalda et al. | |
| 2010/0040591 A1 * | 2/2010 | Giuseppin ............ | C07K 14/415 424/94.1 |
| 2010/0196575 A1 | 8/2010 | Sanchez et al. | |
| 2013/0281669 A1 | 10/2013 | Giuseppin et al. | |
| 2015/0257416 A1 | 9/2015 | Giuseppin et al. | |

FOREIGN PATENT DOCUMENTS

| | | |
|---|---|---|
| GB | 1544812 A | 4/1979 |
| GB | 2484822 A | 4/2012 |
| SG | 183 897 A1 | 10/2012 |
| WO | 97/42834 A1 | 11/1997 |
| WO | 2008069650 A1 | 6/2008 |

OTHER PUBLICATIONS

Hans-Peter Bachmann, "Cheese analogues: a review", International Dairy Journal, pp. 505-515, vol. 11:4-7 (Jul. 1, 2001).
Avocado and Ales, Downloaded Recipe for "Potato Cheese" from web.archive.org: https://web.archive.org/web/20151116053009/http://avocadosandales.com/2015/11/13/potato-cheese, Dated Jan. 16, 2015.
Koningsveld, VG., Ph.D Thesis, "Physico-Chemical and Functional Properties of Potato Proteins". Wageningen University, Wageningen, Jun. 27, 2001, (ISBN: 90-5808-444-2).
Spelbrink, R.E., et al., "Potato Patatin Generates Short-Chain Fatty Acids From Milk Fat That Contribute to Flavour Development in Cheese Ripening". Applied Biochemistry and Biotechnology, 176(1), pp. 231-243, 2015.
Mintel search—various product sheets on cheese analogues (GNPD: 105147, 1002625, 959828, 972434 and 1102647).
9th Food Proteins Course; "Theory & Practice for 10 Plant & Animal Proteins"; Mar. 18-20, 2015, Amsterdam. Presentation: "Potato Proteins: 'Free From' Texture & Nutrition", Jaap Harkema (Avebe), 2015.
MiNTEL search "Tofutti—Mozzarella Style Dairy Free Cheese", (GNPD: 1660262), Published Nov. 2011.
Fox, Patrick F., "Fundamentals of Cheese Science", Springer US, 2000.
Eliane® Product Sheet, Jul. 7, 2015, https://web.archive.org/web/20150707214101/http://www.avebe.com/products/eliane/.
Application Information for "Vegan Cream Cheese with Solanic® Potato Protein", Nov. 2015.
Singh, J., et al., Advances in Potato Chemistry and Technology, Chapter 1: Potato origin and production p. 2, Table 1.1, Academic Press, 2009.
Product Specification Sheet on "Whole Potato Flakes" by Aviko Rixona, Created Nov. 6, 2011: https://www.bacarelexpress.co.ukUmagesLattachments/347.pdf.
Downloaded Product Sheet "Solanic" from Avebe, Feb. 1, 2016: https://web.archive.org/web/20160201103832/http://www.avebe.com/products/solanic.
Downloaded Product Sheet "Potato Protein" from Avebe, Sep. 12, 2015: https://web.archive.org/web/20150911232512/http://www.avebe.com/products/potato-protein/.
Database GNPD (online) (https://www.gnpd.com) Mintel,—Daiya—Deluxe White Chedder Style Veggie Mac & Cheese, pp. 1-4 (Sep. 2015).
Best Vegan Nacho Cheese Sauce, (https://web.archive.org/web/20150608014405/http://gourmandelle.com/), pp. 1-13 (Jun. 8, 2015).
Spelbrink et al., "Potato Patatin Generates Short-Chain Fatty Acids from Milk Fat that Contribute to Flavour Development in Cheese Ripening", Appl. Biochem Biotechnol, 176:231-243 (2015).
Dairy-Free Foods, AVEBE, published online (http://www.avebe.com/dairy-freefoods/), pp. 1-3, (Sep. 9, 2015).
Avebe Innovation by Nature, "Vegan Cream Cheese with Solanic Potato Protein," Application Information, Nov. 2015.

(Continued)

*Primary Examiner* — Jyoti Chawla
(74) *Attorney, Agent, or Firm* — Hoffmann & Baron, LLP

(57) ABSTRACT

The invention pertains to a cheese analogue, comprising water, a root or tuber starch, native potato protein and a fat component. The cheese analogue of the invention has an improved stretch and body, and less off-taste, than known imitation cheese types. The invention further pertains to a method of making said cheese analogue, as well as to food products comprising the cheese analogue.

14 Claims, 3 Drawing Sheets

(56) References Cited

OTHER PUBLICATIONS

Avebe Food, Etenia 457 TM Potato Starch Leaflet, Ref. No. 121076/version 05, Issued Feb. 1, 2010.
Alting, A. C., et al., "Improved Creaminess of Low-Fat Yoghurt: The Impact of Amylomaltase-Treated Starch Domains," Food Hydrocolloids, 23(3), pp. 980-987, (2009).
Avebe, Solanic Product Sheet, Downloaded Feb. 1, 2016, http://web.archive.org/web/20160201103832/http://222.avebe.com/products/solanic/.
Mintel Search for Product sheets on Cheese Analogues for GNPD 1002625, 959828, 972434 and 1102647.
Experimental Results by KMC, filed with Opposition of Nov. 1, 2019, Against the Present Patent, pp. 18-19, Plougmann Vingtoft.
Harkema, J., "Potato Proteins: 'Free From' Texture & Nutrition", 9th Food Proteins Course, Theory & Practice for 10 Plants & Animal Proteins, Mar. 18-20, 2015, Amsterdam.
Avebe, Eliane Product Sheet, Jul. 7, 2015, https://web.archive.org/web/20150707214101/http://www.avebe.com/products/eliane/.

\* cited by examiner

VEGAN CHEESE ANALOGUE

This application is the U.S. National Phase of, and Applicant claims priority from, International Patent Application Number PCT/NL2017/050124 filed 1 Mar. 2017, which claims priority from EP 16158105.3 filed 1 Mar. 2016, each of which is incorporated herein by reference.

The invention is in the field of cheese analogues.

Various types of imitation cheese exist. Such cheeses are usually based on various mixtures of water, protein and fat, which may further comprise starch. Starch in such imitation cheese is often modified starch, which precludes their marketing as a "clean-label" product. In addition, known imitation cheeses have the drawback that they have poor melting characteristics, so that the imitation cheese when present on a heated food product does not display the stretch associated with regular molten cheese. Furthermore, known imitation cheeses generally have an off-taste, which in itself is unattractive, and masking of which by odors and flavors may require labelling of such compounds, which is also unattractive in view of the generally health-conscious consumer market for imitation cheese products.

FIGURES

Figure 1A:
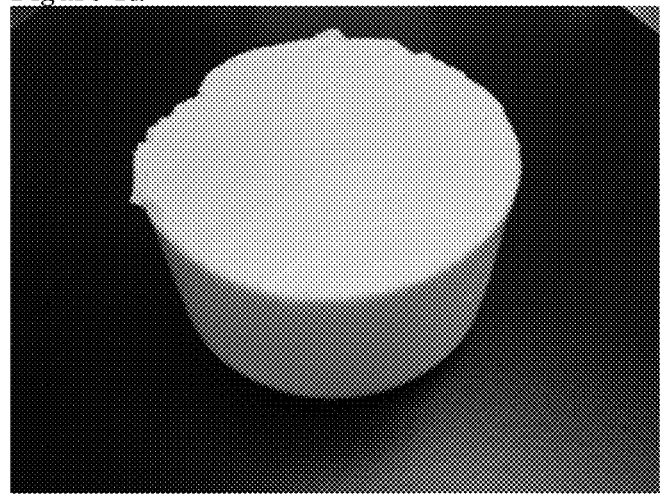
Figure 1B:
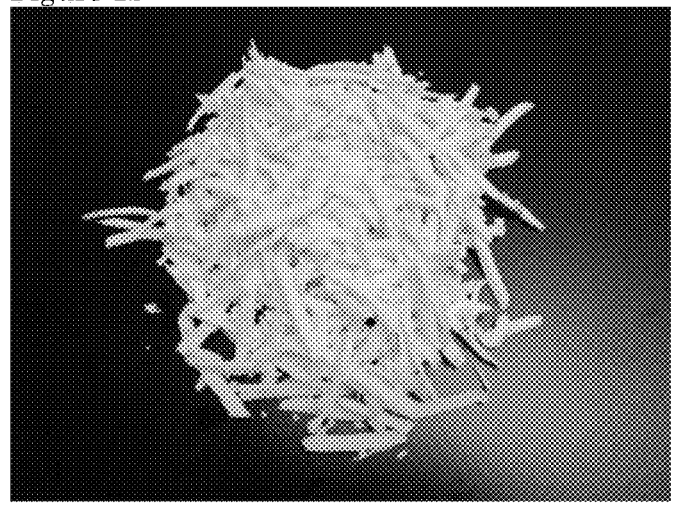
Figure 1C:
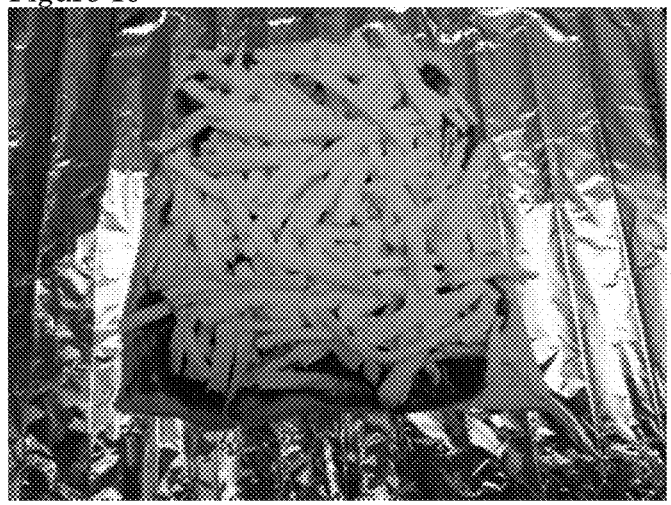
Figure 1D:
Figure 1E:
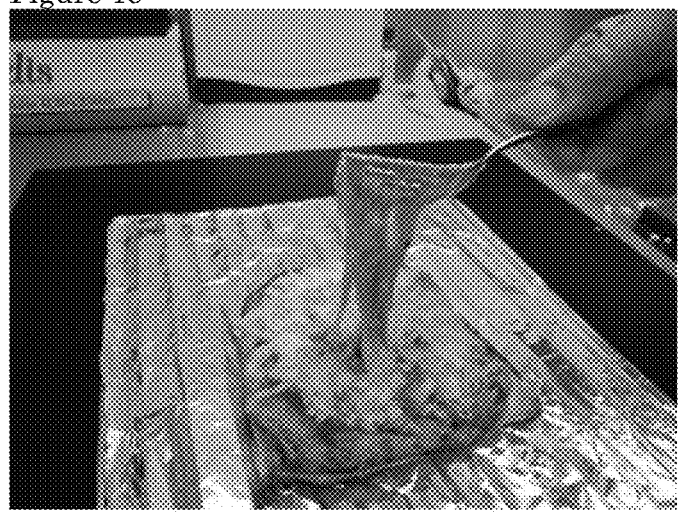

FIG. 1 a-e: Cheese analogue block of the invention according to the standard recipe (a), in shredded form (b), applied on a test pizza (c), after baking the pizza until cheese analogue melting (d), and showing the stretch of the molten cheese analogue (e).

The present invention pertains to a cheese analogue, comprising water, a root or tuber starch, native potato protein and a fat component. A cheese analogue of the invention has the advantage over known products that it has good melt characteristics, so that the cheese in molten form has a stretch which is comparable to molten, dairy-based cheese. In addition, a cheese analogue of the invention has no off-taste, and good body.

Good stretch, in the present context, is defined as a stretch under standardized conditions at 80° C. of at least 35 cm, preferably at least 45 cm, more preferably at least 50 cm, a stretch at 50° C. of at least 70 cm, preferably at least 85 cm, more preferably at least 95 cm, and/or a stretch at 25° C. of at least 40 cm, preferably at least 60 cm, more preferably at least 80 cm. The standardized test for stretch at each temperature is described in the examples.

The root or tuber starch of the invention may be of any root or tuber source. Root or tuber in this context includes the species of potato (*Solanum tuberosum* or Irish potato), sweet potato (*Ipomoea batatas*), cassava (*Manihot esculenta*, syn. *M. utilissima*), yuca dulce (*M. palmata*, syn. *M. dulcis*), yam (*Dioscorea* spp), yautia (*Xanthosoma* spp., including *X. sagittifolium*), taro (*Colocasia esculenta*), arracacha (*Arracacoa xanthorrhiza*), arrowroot (*Maranta arundinacea*); chufa (*Cyperus esculentus*), sago palm (*Metroxylon* spp.), oca and ullucu (*Oxalis tuberosa* and *Ullucus tuberosus*), yam bean and jicama (*Pachyrxhizus erosus* and *P. angulatus*), mashua (*Tropaeolum tuberosum*) and Jerusalem artichoke or topinambur (*Helianthus tuberosus*).

Preferably, the root or tuber is a potato, sweet potato, cassava or yam, more preferably potato, sweet potato or yam, and most preferably the root or tuber is a potato (*Solanum tuberosum*).

The root or tuber starch used in the present invention is preferably a starch which can be gelatinized by heating in water. Gelatinization of starch is the disruption and subsequent solubilization of starch granules into dissolved polysaccharide chains, resulting in increased viscosity of the gelatinized starch mixture, relative to the non-gelatinized starch mixture.

Starch for use in the present invention can be a modified starch, such as a degraded, enzymatically modified or stabilized starch, as long as the modification does not fully preclude gelatinization of the starch. It is preferred however, that the starch used in the present invention is a non-modified starch. Further preferably, the starch used in the present invention is a native starch. Non-modified, in this context, means that the starch has not been chemically or enzymatically modified, although it may have been pre-gelatinized. Native starch in this context means a native, granular starch, such as obtained from the root or tuber. The advantage of using a non-modified or native starch is that such starches can be applied label-free in food products, which is an advantage for cheese analogues targeted at health-conscious consumers.

It is highly preferred that the starch used in the present invention is waxy starch. Starch normally comprises a mixture of amylose and amylopectin, in various proportions. "Regular" starch comprises about 15-20 wt. % amylose and about 80-85 wt. % amylopectin. A waxy starch is a starch which comprises at least 90 wt. % amylopectin, preferably at least 95 wt % amylopectin, more preferably at least 98 wt. % amylopectin. Waxy starch is known in the art, and may be obtained for instance by genetic modification, or by selective breeding of root or tubers, and is also generally commercially available.

In a much preferred embodiment, the starch used in the present invention is a non-modified, waxy potato starch.

Starch used in the present invention is preferably present in a quantity of 10-24 wt. % of the total composition. More preferably, the quantity of starch is 15-22 wt. %, even more preferably 16-19 wt. %, of the total weight of the composition. Shredability and stretch of the cheese analogue is optimal at around 17 wt. % starch. At higher concentrations, stretch and body improve, but the shreds may become somewhat dry and crumble. At concentrations below 17 wt. % starch, the cheese analogue becomes softer and somewhat more difficult to shred, although stretch remains acceptable. In the whole range claimed, taste is not affected by the starch.

The present invention further comprises a native potato protein. Native potato protein is a material comprising a protein content of at least 70 wt. % of pure, native protein, derived from potato (*Solanum tuberosum*), preferably at least 80 wt. %, more preferably at least 85 wt. %, even more preferably at least 90 wt. %, and most preferably at least 95 wt. %, or even at least 98 wt. %. Native potato protein of sufficient protein content and purity can be obtained for instance by the method described in WO 2008/09650, but is also commercially available. Preferably, the level of glycoalkaloids in native potato protein for use in the present invention is less than 200 ppm, more preferably less than 100 ppm, even more preferably less than 50 ppm.

Native potato protein to be used in the present invention can be any potato protein, or potato protein fraction. Native potato protein can tentatively be divided into three classes (i) the patatin family, highly homologous acidic 43 kDa glycoproteins (40-50 wt. % of the potato proteins), (ii) basic 5-25 kDa protease inhibitors (30-40 wt. % of the potato proteins) and (iii) other proteins mostly high molecular weight proteins (10-20 wt. % of the potato proteins) (Pots A. M., Gruppen H., Diepenbeek R. van, Leem J. J. van der, Boekel M. A. J. S. van, Wijngaard G., & Voragen A. G. J. (1999), J. Sci. Food. Agric., 79, 1557 1564 "The effect of storage of whole potatoes of three cultivars on the patatin and protease inhibitor content; a study using capillary electrophoresis and MALDI-TOF mass spectrometry").

Patatin is a family of glycoproteins that have lipid acyl hydrolase and transferase activities and accounts for up to 40 wt. % of the total soluble protein in potato tubers.

Protease inhibitors can be divided into different groups based on their molecular weight. The different groups of protease inhibitors are identified as protease inhibitor I (molecular weight of about 39 kDa), carboxypeptidase inhibitor (molecular weight of about 4 100 Da), protease inhibitors IIa and IIb (molecular weight of about 20.7 kDa), and protease inhibitor A5 (molecular weight of about 26 kDa). The ratio of these different groups of protease inhibitors in the total potato protein depends on the potato variety. Protease inhibitors from potato tuber have a broad range of potentially important applications. Protease inhibitors have for instance shown to be useful in the treatment of diabetes, for eliciting satiety in mammals, for reducing the risk of skin cancer, for inhibiting the growth of bacteria, and for preventing or treating inflammation on pruritus of skin and intestine.

A native potato protein to be used in the present invention may be a general potato protein isolate (i.e., comprising substantially all proteins from potato in their native form), or it may for example be a patatin isolate or a protease inhibitor isolate. Optionally, native potato protein can be further fractionated to obtain separate protein fractions, as described above. Preferably, native potato protein is a dry potato protein powder, such as with a moisture content of at most 10 wt. %, preferably at most 5 wt. %.

Preferably, the potato protein comprises a potato protein protease inhibitor isolate, and it is much preferred if the potato protein is a protease inhibitor protein fraction derived from potato.

Native potato protein, in the present context, may be substituted for any native root- or tuber protein, or mixture thereof, wherein root- or tuber is defined as above. Preferably however, native potato protein is used in the present invention.

The quantity of native potato protein is the present cheese analogue is 0.5-8 wt. %, based on the total weight of the composition, preferably 0.75-6 wt. %, more preferably 1-5 wt. %, even more preferably 1-3 wt. %. Stretch, shredability, and body are optimal at a concentration of potato protein of around 2 wt. %. Higher concentrations of potato protein result in a rather turbid appearance, although stretch and body improve. Lower concentrations than around 2 wt. % result in a slightly watery/runny product after melt. In the whole range claimed, taste is not affected by the quantity of potato protein.

The cheese analogue of the invention further comprises a fat component. The fat component may be any type of fat or oil suitable for human consumption, including for instance dairy or animal derived fat, but preferably the fat component is a plant derived fat or oil. An advantage of using a plant-derived fat or oil is that such fats are generally acceptable to vegetarian and in particular vegan consumers, which is the preferred consumer group for the present cheese analogue.

A fat or oil, in the present context, is a composition comprising at least 95 wt. %, preferably at least 98 wt. %, di- and triglycerides, and is preferably a composition comprising essentially only triglycerides, wherein the quantity of diglycerides is less than 2 wt. %, preferably less than 1 wt. %. The difference between a fat and an oil is that a fat is solid at 20° C., whereas an oil is liquid at this temperature. Liquid in this context means that the viscosity is such that the oil can flow, even though the liquid may be a viscous liquid. Preferably, the fat component is an oil.

The plant derived fat or oil is preferably an oil, and may be derived from any plant. The plant derived fat or oil may for instance be selected from sunflower oil, canola oil, olive oil, palm oil, coconut fat, cocoa fat, soybean oil, rapeseed oil, peanut oil, cotton seed oil, corn oil, linseed oil, rice bran oil, safflower oil, sesame oil, acai palm oil, palm kernel, cottonseed oil or hazelnut oil.

Preferably, the plant derived fat or oil has a bland taste, such as for instance sunflower oil, palm oil, corn oil or soybean oil. Most preferably, the plant derived fat or oil is sunflower oil.

The plant derived fat or oil is preferably has oxidation state, as defined by the anisidine value (AnV), of less than 20, preferably less than 15, even more preferably less than 10. The anisidine value can be determined by the method of the American Oil Chemists Society (AOCS, 2004, Official method Cd. 18-90 in: Official methods and recommended practices of the American Oil Chemists Society.

The quantity of the fat component in the cheese analogue of the invention is 15-35 wt. %, based on the total weight of the composition. Preferably, the quantity of the fat component is 20-30 wt. %, more preferably 22-28 wt. %.

Another component in a cheese analogue of the invention is water. Water is preferably tap water, suitable for use in human food applications. That is, water must be sufficiently clean, and should not contain excess salts, microorganisms or toxic components. In a preferred embodiment, water is microfiltered water. Water used in the preparation of the cheese analogue may be enriched with suitable flavors, odors, salts, and colors, as described below. Water is used in a quantity such that all components of the cheese analogue add up to 100 wt. %. Preferably, in case of a cheese analogue comprising only water, root or tuber starch, potato protein and fat component, water is present in a quantity of 35-74.5 wt. %. In case other components are added to the cheese, the water content can be different to accommodate the relative quantities of the various components.

The cheese analogue may further comprise various optional components, among which flavors, odors and colorants. Suitable flavors include various salts, such as sodium or potassium chloride, as well as organic flavors and odors such as citric acid and various esters and aldehydes. Among these, flavors and odors which are "clean-label" are particularly preferred.

Suitable colorants include annatto (a mix of bixine and norbixine as obtained from *Bixa orrelana*) or ß-carotene. The latter colorant can be obtained in solution form e.g. Ringe Kuhlmann. Among these, "clean-label" colorants are particularly preferred.

In a much preferred embodiment, all components of the cheese, including any optional component, are acceptable to vegans. Further preferably, all components of the cheese, including any optional component, are "clean-label" components, i.e. they do not require reference in the ingredient list to ingredient names which by the general public may be perceived as overly "chemical", "artificial" or "processed" under at least one national food legislation. In particular for health-conscious consumers, such as vegans, such "clean-label" products offer advantages over products comprising ingredients which appear "chemical", "artificial" or "processed". Thus, the cheese analogue of the invention is preferably a clean-label product.

Further preferably, none of the components of the cheese analogue are animal derived, and preferably all components are plant derived. This makes the cheese analogue acceptable for vegetarians and vegans. As such, the cheese analogue is preferably a vegetarian or vegan cheese analogue, comprising only plant-derived components.

In alternative preferred embodiments, the cheese analogue of the invention comprises milk-derived protein source. Preferred milk-derived protein sources include for example casein and/or whey, preferably casein. Thus, the invention furthermore pertains to a cheese analogue as defined above, further comprising whey and/or casein. Milk, in this context, is preferably cow's milk.

The cheese analogue of the invention is preferably a shredded cheese. Shredded cheese is easier to apply on food products which benefit from the addition of molten cheese analogue, than non-shredded cheese analogue. Shreds, in this context, can be pieces of cheese analogue having a longest straight-line diameter of 0.1-5 cm, preferably 0.5-3 cm, even more preferably 1-2 cm. Cheese shreds can be obtained from the cheese analogue of the invention by grating, as is known in the art. Grating may also be referred to as shredding.

The cheese analogue of the invention can be made by
creating a mixture comprising a root or tuber starch,
native potato protein and a fat component in water,
heating the mixture to a temperature of 70-90° C.,
cooling the mixture until solid, and
ripening the cheese for at least 1 day.

Creating the mixture of a root or tuber starch, native potato protein and a fat component in water can be done by combining any two or more of the cheese analogue components, in any order. Preferably, the root or tuber starch and native potato protein are mixed in water to a homogeneous mixture, whereupon the fat component is added, and mixing is continued until an emulsion is obtained. Mixing can be achieved in any conventional way which is suitable for the mixing of highly viscous mixtures, such as stirring, rotating, or the application of screw-based mixing techniques. Such techniques are well-known to the skilled person.

Subsequently, the mixture is heated to a temperature of 70-90° C., preferably 75-85° C. During heating to this temperature, gelatinization of the starch occurs resulting in increased viscosity. This occurs at a temperature of 50-70° C. While further increasing the temperature to beyond about 70° C., the gelatinized starch starts to dissolve so that the viscosity decreases again and the mixture becomes thinner (overcooking). Heating is continued to the intended target temperature, so as to overcook the starch. Heating is preferably slow heating, such as with a heating rate of less than 1° C./min, preferably less than 0.5° C./min. Heating can be done indirect (e.g. in a heated vessel) or direct (e.g. by steam injection).

During the heating step, mixing is preferably continued, although the mixing may be at lower intensity in order to allow for sufficient heat transfer during gelatinization. The mixing intensity may be increased again after the viscosity has decreased due to overcooking, at sufficiently high temperature.

After the heating step, the mixture is a viscous mixture comprising overcooked starch, as well native potato protein and a fat component. This mixture is subsequently cooled, such as to a temperature of below 25° C., preferably below 15° C., more preferably below 10° C., such as for instance 1-8° C. Cooling results in solidification of the mixture into a solid block.

The solid block is subsequently ripened. Ripening is achieved by leaving the cooled block at low temperature, such as at a temperature of below 25° C., preferably below 15° C., more preferably below 10° C., such as for instance 1-8° C., for at least 1 day, preferably at least 2 days, more preferably at least 3 days. This is important, because results in the solid block to further solidify and equilibrate the separate components. This results in sufficient hardness to allow the cheese analogue to be shredded, so that cheese analogue shreds can be more readily obtained by for instance grating.

In a preferred embodiment, the viscous mixture comprising overcooked root or tuber starch comprising water, potato protein and a fat component is poured into a suitable mold after the heating step and prior to the cooling step. This has the advantage that the cheese analogue can be formed in any particular shape, such as square or rectangular blocks or cylindrical objects.

Further preferably, the cooled and ripened cheese analogue is subjected to a grating step. This results in cheese shreds as defined above, which are highly suitable for application on food products which benefit from the addition of molten cheese analogue.

The invention further pertains to food products, which benefit from the addition of molten cheese analogue. The food product of the invention is preferably a food product which is generally eaten hot, although cold food products comprising the cheese analogue of the invention are not to be excluded, in particular when the food product will in general be heated prior to consumption.

Food products which benefit from the addition of molten cheese analogue can be any food product, such as meat-based, fish-based, vegetarian or vegan food products, gluten containing and gluten-free food products, allergen-containing and allergen-free food products. Preferably, a food product of the invention is a vegetarian or vegan food product, and further preferably it is a clean-label food product.

Suitable food products include pizza, pasta, lasagna, croque monsieur, cheese burger, gratin, fondue, hot dog, waffle, sandwich, wrap, baked cheese, tortilla chip or cheese sauce, preferably pizza. Vegetarian or vegan versions of these foods are particularly preferred.

In a much preferred embodiment, a food product of the invention is a ready-made food product, preferably a vegetarian or vegan ready-made food product, preferably clean label. "Ready-made", in this context, refers to food which is prepared industrially and can be heated at home by the consumer.

For the purpose of clarity and a concise description features are described herein as part of the same or separate embodiments, however, it will be appreciated that the scope of the invention may include embodiments having combinations of all or some of the features described.

The invention will now be illustrated by the following, non-limiting examples.

EXAMPLE 1

1 kg portions of cheese analogue were prepared in a Thermomix (Vorwerk) using the standard recipe indicated in table 1 according to the following procedure. Starch in this recipe was a waxy potato starch obtained from Avebe, the Netherlands, under the trade name Eliane 100. Native potato protein was obtained from Avebe, the Netherlands, under the trade name Solanic 300. Salt (NaCl) and oil (sunflower oil) were regular consumer household articles.

TABLE 1

Standard recipe for production of 1 kg cheese analogue

| Ingredient | Amount (g) | wt. % |
|---|---|---|
| Water | 558 | 55.8 |
| Starch | 170 | 17 |
| Native potato protein | 20 | 2 |
| Salt | 2 | 0.2 |
| Oil | 250 | 25 |

The required amount of water (see standard recipe) was transferred to the Thermomix beaker while stirring at 37° C. at speed "3". The starch, potato protein and salt are added, followed by the sunflower oil. After homogenization the blend is slowly heated to 85° C. Once the starch starts to gelatinize the stirring speed is reduced to "1". After the viscosity drops, stirring speed is increased to 3-4 again until the temperature of 85° C. is reached. The hot viscous mass is poured into plastic containers (190 ml), covered with a screw cap and stored at 4° C. Cheese was subsequently grated to obtain cheese shreds, and heated under various conditions to evaluate stretch, body (mouth-feel) and off-taste.

The quantities in the standard recipe were varied to study the influence of variation in the quantities of starch, potato protein and fat component, as indicated below.

Quantitative Measurement of Stretch Performance

A simple test was developed to quantify stretch performance.

Cheese are shredded and 100 g of the shreds are put into a 250 ml glass beaker. If products are too soft for shredding the pasty mass is put into the beaker. The beaker is heated in a steam oven at 100° C. for 20 min. The steam guarantees that no evaporation of water from the cheese analogue occurs during heating.

Once temperature has declined to 80° C. the molten cheese analogue is stirred with a standard spatula (the blade vertical with respect to cheese mass). Once the blade of the spatula is fully covered with cheese the spatula is carefully lifted from the beaker with a speed of 5 cm/s seconds. The distance between start of lifting and breaking of the threads is marked. This measurement is repeated 5 times and the average is marked. The same measurement is repeated after cooling to 50 and 25° C.

Good melt is normally indicated by a high "stretch" at 80° C. The measurement at 80° C. relates more to the melt and the viscosity in the melting stage since 80° C. is too hot for a food product to consume.

At 50° C. (temperature at which one begins to consume a food product such as a pizza) one may observe an increase of the distance upon breaking. This indicates good stretch.

At 25° C. we may observe a further increase in distance or a decrease in distance accompanied with a higher force to create the threat.

Good stretch is indicated by a stretch at 80° C. of at least 35 cm. Alternatively, good stretch is indicated by a stretch at 50° C. of at least 70 cm. Further alternatively, good stretch is indicated by a stretch at 25° C. of at least 40 cm. Particularly good stretch is characterized by an increase in distance after cooling to 50° C., followed by decrease in distance upon further cooling to 25° C.

A comparison was made with imitation cheeses presently on the market. The comparative products included Daiya Cheddar type shreds, Daiya Classic Blend, Daiya Mozzarella Type shreds, Daiya Cheddar Style Slices, Go Veggie, Lisanetti Almond Cheddar Style and Lisanetti Almond Jalapeno Jack Style. The results are displayed in table 3, and compared to a cheese analogue according to the standard recipe displayed above.

TABLE 2

Stretch performance of cheese analogues

| Cheese analogue | Oil | Potato protein (wt %) | Salt (wt %) | Starch (wt. %) | Water (wt %) | Stretch 80° C. (cm) | Stretch 50° C. (cm) | Stretch 25° C. (cm) |
|---|---|---|---|---|---|---|---|---|
| 1 | 25 | 2 | 0.2 | 10 | 62.8 | 67 | 85 | 94 |
| 2 | 25 | 2 | 0.2 | 14 | 58.8 | 60 | 130 | 140 |
| 3 | 25 | 2 | 0.2 | 16 | 56.8 | 63 | 130 | 160 |
| 4 | 25 | 2 | 0.2 | 18 | 54.8 | 63 | 140 | 90 |
| 5 | 25 | 2 | 0.2 | 20 | 52.8 | 54 | 153 | 75 |
| comparative | 25 | 2 | 0.2 | 25 | 47.8 | too thick | too thick | too thick |
| comparative | 25 | 0 | 0.2 | 17 | 57.8 | no cheese formed | | |
| 8 | 25 | 0.5 | 0.2 | 17 | 57.3 | 45 | 105 | 185 |
| 9 | 25 | 1 | 0.2 | 17 | 56.8 | 66 | 150 | 172 |
| 10 | 25 | 2 | 0.2 | 17 | 55.8 | 58 | 148 | 190 |
| 11 | 25 | 4 | 0.2 | 17 | 53.8 | 52 | 152 | 173 |
| 12 | 25 | 6 | 0.2 | 17 | 51.8 | 39 | 96 | 94 |
| comparative | 25 | 9 | 0.2 | 17 | 48.8 | 21 | 49 | 75 |

TABLE 3

Comparison of standard recipe with commercial imitation cheeses

| | Stretch 80° (cm) | Stretch 50° C. (cm) | Stretch 25° C. (cm) | Remarks |
|---|---|---|---|---|
| Standard recipe | 58 | 148 | 190 | |
| Daiya Cheddar type shreds | 18 | 20 | too thick | "thick chewing gum" |
| Daiya Classic Blend | 20 | 8 | too thick | "thick chewing gum" |
| Daiya Mozzarella Type shreds | 15 | 19 | too thick | "thick chewing gum" |

TABLE 3-continued

Comparison of standard recipe with commercial imitation cheeses

|  | Stretch 80° (cm) | Stretch 50° C. (cm) | Stretch 25° C. (cm) | Remarks |
|---|---|---|---|---|
| Daiya Cheddar Style Slices | 33 | 64 | 27 |  |
| Go Veggie | 15 | 20 | 29 | extremely thin |
| Lisanetti Almond Cheddar Style | 75 | too thick | too thick | "thick chewing gum" |
| Lisanetti Almond Jalapeno Jack Style | 32 | too thick | too thick | "thick plastic mass" |

EXAMPLE 2

Application of Cheese Analogues on a Food Product

A cheese analogue was prepared according to the standard recipe, and subsequently shredded. Application of the shreds on pizza dough sheet on which a layer of tomato paste is spread (Albert Heijn vers pizzadeeg & tomatensaus (fresh pizza dough and tomato paste)). Pictures of the produced cheese analogue block, cheese analogue shreds, and on the raw and heated pizza are given in FIG. 1, as well as a picture in which the stretch is visible. It was concluded that the cheese analogue behaves near exactly as natural cheese.

EXAMPLE 3

Melt Performance and Stretch of Cheese Analogues

Cheese shreds were prepared following the general preparation procedure described in Example 1. The source of potato protein and the source of starch were varied as displayed in tables 5 and 6. Quantities of starch and protein were as optimized in Example 1, to ensure proper comparison.

Cheese shreds were evaluated on melting and taste characteristics after applying shreds to a pizza dough sheet on which a layer of tomato paste is spread (Albert Heijn vers pizzadeeg & tomatensaus (fresh pizza dough and tomato paste)).

The pizza was heated to 200° C. in an oven and the melt was observed. After melting the stretch was evaluated as well as the mouthfeel (body) and (off)taste.

Cheese are evaluated in terms of:
1) Shredability, is the mass firm enough for shredding, are shreds non-sticky? Is the appearance an attractive elastic solid, or less attractive crumbly and dry (1 bad-10 very good)
2) Melt, does the formulation melt after heating in the oven? Do any shreds remain after melting? Is the appearance after melt an attractive viscous-elastic turbid appearance, or an unattractive translucent appearance? (1 bad-10 very good)
3) Stretch, does the melted cheese show stretch (defined as elongation and concomitant thinning of the thread which results from pulling one part of the molten cheese analogue, without breaking) or no stretch? And if there is stretch, is it a watery slimy stretch, or a dry fluent stretch, reminiscent of molten cheese? (1 bad-10 very good)
4) Body, what is the mouthfeel of the molten cheese analogue? Is it a solid dry hot mouthfeel, or a slimy/watery mouthfeel? (1 bad-10 very good)
5) (Off) taste, is there any off taste in terms of protein taste, metallic taste, starch-like taste, or is the taste neutral? (1 bad-10 very good)

TABLE 4

Commercial availability of ingredients used

| Waxy potato starch | Eliane 100 (Avebe) |
|---|---|
| Waxy rice starch | Beneo/Remy |
| Tapioca starch | Ingredion |
| Corn starch | Ingredion |
| Wheat starch | Roquette |
| PI potato protein | Solanic 300 (Avebe/Solanic) |
| Patatin potato protein | Solanic 200 (Avebe/Solanic) |
| Soy concentrate | Arcon SM (ADM) |
| Whey isolate | BiPRO (Davisco Foods International) |

TABLE 5

Variation in protein source

| Starch | wt. % | Potato protein | wt. % | Shredability | Melt | Stretch | Body | Taste |
|---|---|---|---|---|---|---|---|---|
| Waxy potato starch | 17 | PI | 2 | 7 | 8 | 8 | 7 | 10 |
| Waxy potato starch | 17 | Patatin | 2 | 6 | 7 | 7 | 6 | 8 |
| Waxy potato starch | 17 | Soy concentrate | 2 | 7 | 7 | 6 | 6 | 8 |
| Waxy potato starch | 17 | Whey isolate | 2 | 6 | 0 | 0 | 1 | 3 |

TABLE 6

Variation in starch source

| Starch | wt. % | Potato protein | wt. % | Shredability | Melt | Stretch | Body | Taste |
|---|---|---|---|---|---|---|---|---|
| Waxy potato starch | 17 | PI | 2 | 7 | 8 | 8 | 7 | 10 |
| Waxy rice | 17 | PI | 2 | 0 | 7 | 4 | 7 | 9 |
| Tapioca | 17 | PI | 2 | 3 | 7 | 4 | 8 | 9 |
| Corn | 17 | PI | 2 | 6 | 1 | 0 | 7 | 7 |
| Wheat | 17 | PI | 2 | 7 | 2 | 0 | 7 | 7 |

The invention claimed is:

1. A cheese analogue, comprising water, a waxy root or tuber starch, native potato protein and a fat component, wherein the waxy root or tuber starch comprises at least 90 wt. % amylopectin; wherein the total quantity of waxy root or tuber starch is 10-24 wt. % of the total composition; and wherein the cheese analogue exhibits stretch of at least 35 cm at 80° C., at least 70 cm at 50° C., or at least 40 cm at 25° C., under standard conditions.

2. A cheese analogue according to claim 1, wherein the waxy root or tuber starch is potato starch.

3. A cheese analogue according to claim 1, wherein the starch is a non-modified starch.

4. A cheese analogue according to claim 1, wherein the quantity of native potato protein is 0.5-8 wt. % of the total composition.

5. A cheese analogue according to claim 1, wherein the quantity of the fat component is 15-35 wt. % of the total composition.

6. A cheese analogue according to claim 1, wherein the fat component is a plant-derived fat or oil.

7. A cheese analogue according to claim 1, wherein the cheese further comprises one or more of a suitable colorant, odor and/or flavor.

8. A cheese analogue according to claim 1, wherein the cheese further comprises a milk-derived protein source, such as casein or whey.

9. A cheese analogue according to claim 1, wherein the cheese analogue is a vegan cheese analogue comprising only plant-derived components.

10. A food product for eating hot, comprising a cheese analogue as defined in claim 1.

11. A food product according to claim 10, wherein the food product is pizza, pasta, lasagna, croque monsieur, cheese burger, gratin, fondue, hot dog, waffle, sandwich, wrap, baked cheese, tortilla chip or cheese sauce.

12. A method of making a cheese analogue according to claim 1, comprising
creating a mixture comprising a root or tuber starch, native potato protein and a fat component in water,
heating the mixture to a temperature of 70-90° C.,
cooling the mixture until solid, and
ripening the cheese for at least 1 day.

13. A method according to claim 12, wherein the mixture is poured in a suitable mold prior to cooling.

14. A method according to claim 12, wherein after the ripening step, the cheese is grated.

* * * * *